Patented Sept. 7, 1937

2,092,084

UNITED STATES PATENT OFFICE 2,092,084

COMPOSITION AND METHOD FOR JOINING SURFACES

Earle C. Pitman, Lincroft, N. J., assignor to E. I. du Pont de Nemours & Company, Wilmington, Del., a corporation of Delaware No Drawing. Application June 4, 1935, Serial No. 24,895

2 Claims. (Cl. 154—40)

This invention relates to improvements in the joining together of surfaces with cellulose derivative cements or adhesives, and more particularly to the joining of shoe parts with cellulose derivative adhesives as, for example, leather soles to shoe uppers.

Standard practice for the manufacture of shoes in which the soles are joined to the uppers by means of adhesives, provides for the application of a suitable adhesive to designated areas of the shoe parts to be joined such as, for example, to the overlasted edge of the shoe upper and to a limited area along the edge of the shoe sole. The adhesive is permitted to dry in order to allow safe storage of the materials to which the adhesive has been applied until such time as it is convenient or desired to finally join the parts. Immediately preceding the assembling of the adhesive coated parts, the dried adhesive is activated or softened by the application of a suitable activator or solvent or a combination of such materials. The volatility of this activator is so adjusted as to allow ample time for assembly of shoe parts by the operator before placing in the pressure device commonly used and which is necessary in order that an acceptable bond between the two parts be secured.

In present practice, this activator or softener, in order to meet certain necessary basic requirements, is of such character as to retard the desired speed in production because of the excessive time necessary for the parts to remain in the pressure device to permit substantially complete removal of the volatile adhesive softener or until the adhesive has set completely. Attempts have been made to reduce this time period by the use of more volatile activators or softeners but these have not met with material success, since too high a volatility of the ordinary softener does not allow sufficient time for the operator to make proper assembly of the shoe parts before placing them in the pressure device. This expedient, therefore, has not furnished a solution to the problem since an inferior and unacceptable bond between the component parts has resulted from such attempted modifications.

This invention has as an object the provision of an improved method of adhering surfaces together where the adhesive previously applied has been allowed to dry prior to bringing the surfaces together for assembly.

A further object of the invention is the provision of an improved activator or softener for the dried adhesive, which allows sufficient time for assembling the adhesive coated parts and yet affords substantial reduction in drying time after the parts have been assembled in the pressure device.

A still further object of the invention is the provision of a cellulose derivative adhesive activator or softener which possesses unusual solvent or penetrating power thereby providing more uniform and complete penetration throughout the adhesive film, thus insuring a strong bond between the two surfaces to be joined.

These objects are accomplished by the use of propylene oxide essentially alone or in combination with other volatile materials in admixture with an essentially non-volatile modifier as an activator or softener for the dried and hardened cellulose derivative type adhesive.

In co-pending application, Serial No. 18,510, filed April 27, 1935, by Percy M. Clark and Thomas T. Taylor, the use of propylene oxide alone or in combination with other solvents of the same order of volatility is disclosed as an activator or softener for dried cellulose derivative adhesives. The products and process described therein represent a material improvement in the art where an activator of relatively high volatility and a comparatively short drying time is required.

The present invention is a modification of the above designated application in that it lengthens the time cycle required for the assembling step without substantially increasing the time required for the hardening of the adhesive while the unit remains in the pressure device.

The invention herein disclosed also has non-staining properties. In the past the cement softeners which were commonly used frequently caused undesirable staining of the shoe parts, an effect which was particularly troublesome in connection with white fabric or light colored suede uppers. The ingredients of the softeners apparently extracted the tannin and other colored matter from the leather sole and carried it into the upper by wicking or capillary action. It has been found that the softeners of this invention, particularly when composed of propylene oxide and a small amount of substantially non-volatile modifier alone, are of particular advantage in this respect. When other solvents are included, which in themselves tend to extract tannin, this staining tendency is reduced in proportion to the amount of propylene oxide and a relatively small amount of substantially non-volatile modifier present in the composition.

The following examples are given to illustrate my invention:

*Example I*

Strips of leather, one face of which had previously been roughened, were coated with a film of adhesive having the following composition:

|  | Per cent |
|---|---|
| Cellulose nitrate (viscosity 7 seconds) | 20.0 |
| Denatured ethyl alcohol | 9.0 |
| Camphor | 3.8 |
| Dibutyl phthalate | 1.2 |
| Methyl acetone | 66.0 |
|  | 100.0 |

The viscosity characteristic of the nitrocellulose utilized in this cement was determined in accordance with A. S. T. M. designation D—301—33, formula A.

This adhesive was allowed to dry and an activator or softener composition of the following composition was then uniformly applied to the hardened adhesive surface by means of a brush:

|  | Per cent |
|---|---|
| Propylene oxide | 99 |
| Dibutyl phthalate | 1 |
|  | 100 |

The test strips were allowed to remain exposed to the air for a period of 10 seconds and then during the next 5 seconds were joined to similarly treated pieces of leather, thereby simulating a time cycle required in the assembly operation in the manufacture of shoes. The joined strips were then placed under a pressure of about 60 pounds per square inch for a period of 10 minutes at normal room temperature. A manual test of the pieces so joined indicated definite improvement with respect to uniform adhesion and greater joint strength than was obtained in testing similar pieces where the adhesive had been softened by other activators of the prior art such as acetone or other solvents of similar properties.

The above tests were also made with a slight modification, namely, the softened adhesive surfaces were joined after a total exposure period of only 10 seconds. Adhesion tests on a standard Scott tensile tester immediately upon removal from the pressure device showed that the strength of the joint where the propylene oxide-dibutyl phthalate activator was used was approximately 50% greater than corresponding tests where other activators of the prior art, such as acetone or related materials, were used. This increased adhesion is particularly important in commercial practice, since the production of a strong joint that will counteract the spreading effect of the metal instep reinforcement so frequently used in shoe construction is highly desirable.

Similar test pieces prepared as described above were tested for adhesion strength after a period of 48 hours exposure at room temperature. A greater adhesion strength had developed in both series of samples but the improvement in adhesion where the propylene oxide-dibutyl phthalate activator was used in place of other activators was still 50% greater.

The following examples are illustrative of activator or softener compositions which have a longer drying time and show how the basic propylene oxide-dibutyl phthalate composition of Example I may be modified to meet requirements of varying drying time requirements:

*Example II*

|  | Per cent |
|---|---|
| Propylene oxide | 75 |
| Acetone | 24 |
| Dibutyl phthalate | 1 |
|  | 100 |

*Example III*

|  | Per cent |
|---|---|
| Propylene oxide | 89 |
| Ethyl acetate | 10 |
| Dibutyl phthalate | 1 |
|  | 100 |

It has been found that the propylene oxide-dibutyl phthalate combination may be used as an activator or softener alone or that there may be instances where a slower evaporating activator or solvent is desired. To meet such requirements, the propylene oxide may be combined with other solvents of the same order of volatility for the adhesive in proportions so adjusted as to meet the required time schedule established for any individual set of conditions. Such combination may be readily determined by ordinary tests based on the knowledge described in the present specifications pertaining to the efficiency of the primary constituents of propylene oxide and dibutyl phthalate.

The above Examples II and III illustrate the use of other active solvents of the same order of volatility in conjunction with propylene oxide. In order, however, to take advantage of the desirable properties of propylene oxide, it should be present in any combination in preponderant amounts.

The unusual and peculiar penetrating power of propylene oxide on hardened nitrocellulose films, whereby a more uniform and thorough activation of the cement film is accomplished, is described elsewhere in these specifications. While this improved penetration of the cement film afforded some retardation of the evaporation of this highly volatile solvent, it was found that when a material of the type exemplified by dibutyl phthalate was added, real and practical advantages were secured. Thus the improved compositions of the present invention not only make use of the desirable properties of the propylene oxide as the major ingredient, but also provide a more flexible operation in the assembly step of the process by suitably retarding the evaporation of the highly volatile portion of the composition, without seriously increasing the time cycle for the assembled unit in the pressure device. Thus the small quantity of the dibutyl phthalate present in the improved softener functions to prevent too rapid dissipation of the more volatile ingredients, so that the duration of the tacky period is increased to such extent as to allow more leeway for the slower and less skilled operators.

In using propylene oxide-dibutyl phthalate combination as the activator, either alone or in combination with other solvents, no substantial departure from standard operating practice is necessary. When the parts coated with the hardened or dried cement are to be finally assembled, softener is applied in any manner such as by brushing or swabbing, by mechanical means such as by a jet or spray or in any other suitable manner so that the cement area is uniformly treated. The individual parts can be immediately assembled and placed in a pressure device commonly used in the manufacture of cemented shoes and held in the device for such a time as is necessary for the cement to set. Such a result depends upon substantially complete elimination of the activator or solvent from the cement layer through evaporation and/or absorption by the leather.

In the examples noted, the quantity of the substantially non-volatile modifier content is given as 1%. This represents the preferred amount although the amount may conveniently range between 0.5 and 2%. Quantities greater than 2% tend to retard the elimination of the volatile portion of the softener during the final stage of the process, thus increasing the time for the cement to harden while the shoe is in the pressure device. This, of course, nullifies the improvement gained in the practice of the present invention. An amount of 1% of the essentially non-volatile modifier has been found to provide the best results in operating under suitable time cycles and for securing maximum adhesion strength at critical phases of the process.

While dibutyl phthalate is mentioned as the essentially non-volatile modifier, other similar materials commonly known as softeners or plasticizers, such as tricresyl phosphate, dibutyl tartrate, diethyl phthalate, dimethyl cellosolve phthalate, castor oil, etc., may be used, the choice depending upon the particular cellulose derivative used in the adhesive.

Instead of propylene oxide, butylene oxide or iso-butylene oxide may be used, although when using these alternative materials the proportion of higher boiling non-volatile modifiers in the composition is lower because of the high boiling points of butylene and isobutylene oxides as compared to propylene oxide.

The invention finds particular adaptability in the manufacture of shoes or for joining shoe parts such as soles to shoe uppers. The invention is also applicable in the manufacture of leather belts such as are used for industrial power transmissions, for joining celluloid objects, motion picture film, lacquered paper or moisture-proof regenerated cellulose, cellulose acetate wrapping materials, etc. Because of the very satisfactory results obtained, other applications for the use of the activator herein disclosed for dried or hardened cement film will readily occur to those skilled in the art.

The unusual solvent power of propylene oxide affords desired penetrating properties when used in activating hardened cellulose derivative cements while the substantially non-volatile portion of the composition holds the highly active solvent on the cement film for a longer period of time, thus definitely contributing to the attainment of more uniform and thorough softening of the film.

The composition also permits more flexible operating practices by extending the time cycle for manually uniting the cemented parts, thus providing a margin for less skilled operators and reducing the number of unsatisfactory finished products obtained.

Greater adhesion strength of the surfaces joined is obtained in using the compositions of the present invention and this is of particular importance during the period immediately following removal of the cemented unit from the pressure device, since in many cases the shoe contains a metal reinforcing strip at the instep and this tends to separate the joint where the adhesion is not sufficient.

The greater volatility of the propylene oxide permits a shorter time cycle in the pressure device which results in increased production. The presence of the high boiling modifier does not adversely affect this step in the operations but rather serves to advantage during the previous step, that is, the assembling or uniting of the parts prior to placing in the pressure device. No departure from present operating practice is necessary in using the activators or softeners of the present invention so that no changes are necessary in the general manufacturing operations. On the contrary, the use of the activators of the present invention increases the rate of production, the economic advantage of which is obvious.

In cases where a softener is applied to the dry adhesive by means of a machine, the softener herein disclosed presents an additional advantage in that it will not tend to clog the outlets of the machine. The softeners of the prior art do not present this advantage and frequent cleaning is necessary, thereby retarding production.

It is apparent that many widely different embodiments of this invention may be made without departing from the spirit and scope thereof and, therefore, it is not intended to be limited except as indicated in the appended claims.

I claim:

1. Improvement in the method of joining surfaces which comprises applying cellulose derivative adhesive to at least one of the surfaces to be joined, allowing the adhesive to harden, activating the hardened adhesive on at least one of the surfaces to be joined by means of an activator consisting essentially of propylene oxide 99%, dibutyl phthalate 1%, joining the two surfaces, and applying pressure.

2. Improvement in the method of joining surfaces which comprises applying cellulose derivative adhesive to at least one of the surfaces to be joined, allowing the adhesive to harden, activating the hardened adhesive on at least one of the surfaces to be joined by means of an activator consisting essentially of propylene oxide and a high boiling substantially non-volatile modifier which is a plasticizer for the cellulose derivative adhesive, said high boiling substantially non-volatile plasticizer being present in an amount approximately 0.5–2.0%, joining the two surfaces and applying pressure.

EARLE C. PITMAN.